(12) United States Patent
Noh et al.

(10) Patent No.: US 7,407,316 B2
(45) Date of Patent: Aug. 5, 2008

(54) LCD BACKLIGHT SYSTEM USING LIGHT EMITTING DIODE CHIP

(75) Inventors: Ji-whan Noh, Suwon-si (KR); Jin-gil Jeong, Seoul (KR); Il-yong Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 134 days.

(21) Appl. No.: 11/313,761

(22) Filed: Dec. 22, 2005

(65) Prior Publication Data

US 2006/0139955 A1 Jun. 29, 2006

(30) Foreign Application Priority Data

Dec. 23, 2004 (KR) ............... 10-2004-0111103

(51) Int. Cl.
*F21V 7/04* (2006.01)
*G09F 13/04* (2006.01)
(52) U.S. Cl. ............... 362/612; 362/29; 362/30; 362/97
(58) Field of Classification Search .......... 362/29, 362/30, 97, 612
See application file for complete search history.

(56) References Cited

U.S. PATENT DOCUMENTS 7,152,988 B2 * 12/2006 Hung ............... 362/97
7,273,291 B2 * 9/2007 Kim et al. ............... 362/30
2002/0080615 A1 * 6/2002 Marshall et al. ............... 362/333
2004/0151006 A1 8/2004 Yang
2005/0286251 A1 * 12/2005 Smith ............... 362/327
2006/0012989 A1 * 1/2006 Lee ............... 362/231
2006/0087866 A1 * 4/2006 Ng et al. ............... 362/612

FOREIGN PATENT DOCUMENTS

| CN | 1050785 | 4/1991 |
| JP | 8-297282 | 11/1996 |
| JP | 10-82916 | 3/1998 |
| JP | 2000-241808 | 9/2000 |
| KR | 2003-44238 | 6/2003 |
| KR | 2003-72036 | 9/2003 |
| KR | 2004-57383 | 7/2004 |

\* cited by examiner

*Primary Examiner*—Sandra O'Shea
*Assistant Examiner*—James W Cranson
(74) *Attorney, Agent, or Firm*—Stanzione & Kim, LLP

(57) ABSTRACT

A backlight system and an LCD employing the backlight system. The backlight system includes a plurality of light emitting devices arranged on a base plate to form a plurality of lines each including a plurality of light emitting devices, and a light guide panel having a sidewall spaced apart from the plurality of light emitting devices such that light incident from the plurality of light emitting devices is dispersed by inner reflection, and a scattering region formed adjacent to the base plate such that light incident into the scattering region is irregularly reflected to emit in a direction away from the base plate.

35 Claims, 5 Drawing Sheets

LCD BACKLIGHT SYSTEM USING LIGHT EMITTING DIODE CHIP

CROSS-REFERENCE TO RELATED APPLICATIONS

This application claims the benefit of Korean Patent Application No. 10-2004-0111103, filed on Dec. 23, 2004, in the Korean Intellectual Property Office, the entire contents of which are incorporated herein by reference.

BACKGROUND OF THE INVENTION

1. Field of the Invention

The present general inventive concept relates to a backlight system and a liquid crystal display using the same, and more particularly, to a direct light type of backlight system used in a liquid crystal display.

2. Description of the Related Art

A liquid crystal display (LCD), commonly known as one of the types of flat panel display devices, is a passive display that forms an image using incident light from an outside source as opposed to using self luminescence. A backlight system may be used in a LCD device and may be disposed at a rear portion of the LCD to irradiate light toward a liquid crystal panel.

Backlight systems are classified into two different types, a direct light type of backlight system and an edge light type of backlight system. In the direct light backlight system, light is emitted from a plurality of light sources disposed in back of a liquid crystal panel and is irradiated toward the liquid crystal panel. In the edge light type backlight system, light is emitted from a light source disposed on a sidewall of a light guide panel and is transmitted to the liquid crystal panel. The direct light type of backlight system may use a light emitting diode, which emits Lambertian light as a point light source.

Backlight systems use a diffusion plate for diffusing light emitted from a light source such that light is uniformly irradiated onto the liquid crystal panel.

In the case of the direct light type backlight system, which uses a light emitting diode as a light source, a transmission diffusion plate is disposed above the light source.

If the transmission diffusion plate is disposed too close to the light source, color of the light emitting diode used as a point light source appears as a spot from the light emitting diode.

Accordingly, in order to diffuse the light emitted from the light source more uniformly, it is necessary to increase a distance between the light source and the transmission diffusion plate, which results in an increase in the thickness of the backlight system.

However, when the backlight system is thick, an LCD employing such a backlight system, for instance, an LCD TV, is also thick, thus failing to satisfy a slim design requirement.

In the case of the direct light type backlight system, a plurality of light emitting diodes are arranged in two or more lines, with each line including a plurality of light emitting diodes. When a distance between the lines increases, an undesirable bright line appears. Accordingly, the distance between the lines should be kept sufficiently close such that the bright line does not appear.

SUMMARY OF THE INVENTION

The present general inventive concept provides a backlight system and LCD using the same. The backlight system may be a direct light type of backlight system that is made to accommodate specified thickness design requirements. According to the present general inventive concept the backlight system provides a distance between light emitting device lines that is sufficiently wide, to allow light to be uniformly irradiated.

The foregoing and/or other aspects of the general inventive concept may be achieved by providing a backlight system including a plurality of light emitting devices arranged on a base plate to form a plurality of lines and a light guide panel having a sidewall spaced apart from the plurality of light emitting devices such that light incident from the plurality of light emitting devices is dispersed by inner reflection, and a scattering region formed adjacent to the base plate such that light incident into the scattering region is irregularly reflected to emit away from the base plate.

Additional aspects and advantages of the present general inventive concept will be set forth in part in the description which follows and, in part, will be obvious from the description, or may be learned by practice of the general inventive concept.

The scattering region may be discontinuously formed and may be composed of at least one component having a width that increases in proportion to a distance from the plurality of light emitting devices. The scattering region may also include a scattering pattern formed to irregularly reflect incident light or a diffusion material coated to irregularly reflect incident light.

The above backlight system may further include a transmission diffusion plate to diffuse and transmit light that emits from the plurality of light emitting devices and that travels in a direction away from the base plate and through the light guide panel.

The above backlight system may further include a partial blocking member that partially transmits light that is emitted from the light emitting device which travels in a direction away from the base plate by decreasing the amount of the traveling light.

The partial blocking member may include a reflection member having a plurality of holes. The partial blocking member may also have a structure including a transparent member and a diffusion material region formed on at least one surface of the transparent member.

The backlight system may further include at least one of a brightness enhancement film to enhance the directivity of light emitted from the transmission diffusion plate and a polarization enhancement film to enhance polarization efficiency.

The light emitting device may include a light emitting diode chip to generate light, and a collimator to collimate light incident from the light emitting diode chip.

The collimator may be any one of a side emitter allowing incident light to travel in an approximate side direction and a dome-shaped collimator.

The light guide panel may be shaped in a long block arranged in parallel with at least one of the lines of the plurality of light emitting devices, and is disposed at an outer portion of the line of the plurality of light emitting devices and between the lines of the plurality of light emitting devices. The light guide panel may be made of transparent polymethyl methacrylate (PMMA).

The scattering region may be formed at a surface adjacent to the base plate of the light guide panel. The foregoing and/or other aspects of the general inventive concept may be achieved by providing an LCD including a liquid crystal panel and a backlight system to irradiate light toward the liquid crystal panel, where the backlight system includes a plurality of light emitting devices arranged on a base plate to form a plurality of lines, and a light guide panel having a sidewall spaced apart from the plurality of light emitting devices such that light incident from the plurality of light emitting devices is dispersed by inner reflection, and a scattering region formed adjacent to the base plate such that light incident into the scattering region is irregularly reflected to emit in a direction away from the base plate.

The foregoing and/or other aspects of the general inventive concept may be achieved by providing an apparatus including a plurality of light emitting devices arranged on a base plate to emit light by inner reflection, and at least one light guide panel to guide the light emitted by the plurality of light emitting devices, where the light guide panel includes a scattering region having at least two components that vary in width based on a distance between the plurality of light emitting devices.

The foregoing and/or other aspects of the general inventive concept may be achieved by providing an apparatus including at least two lines of light emitting devices denoted 'n', arranged on a base plate, where each line includes at least two light emitting devices, and a plurality of light guide panels to guide the light emitted by the plurality of light emitting devices, where the number of light guide panels is 'n+1'.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

Figure 1:
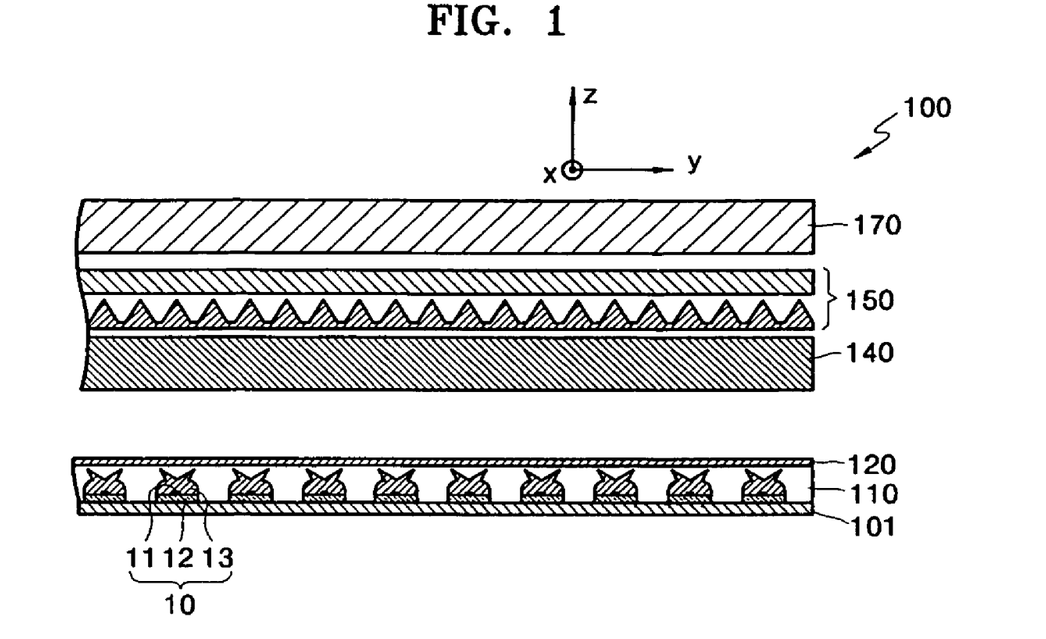
FIGS. 1 and 2 are schematic sectional views of a backlight system according to an embodiment of the present general inventive concept.
Figure 2:
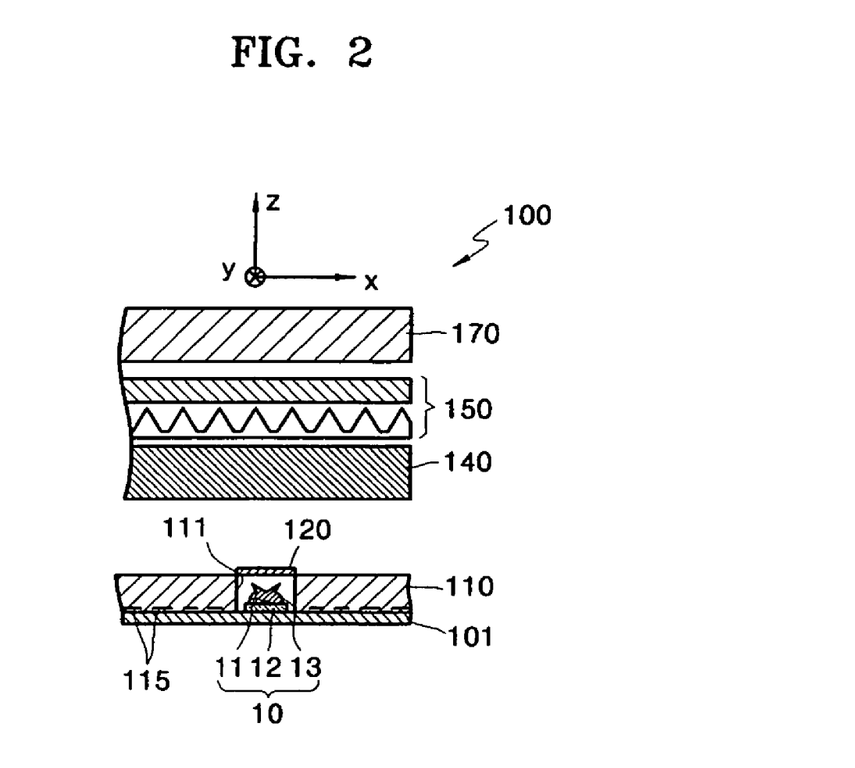
Figure 3:
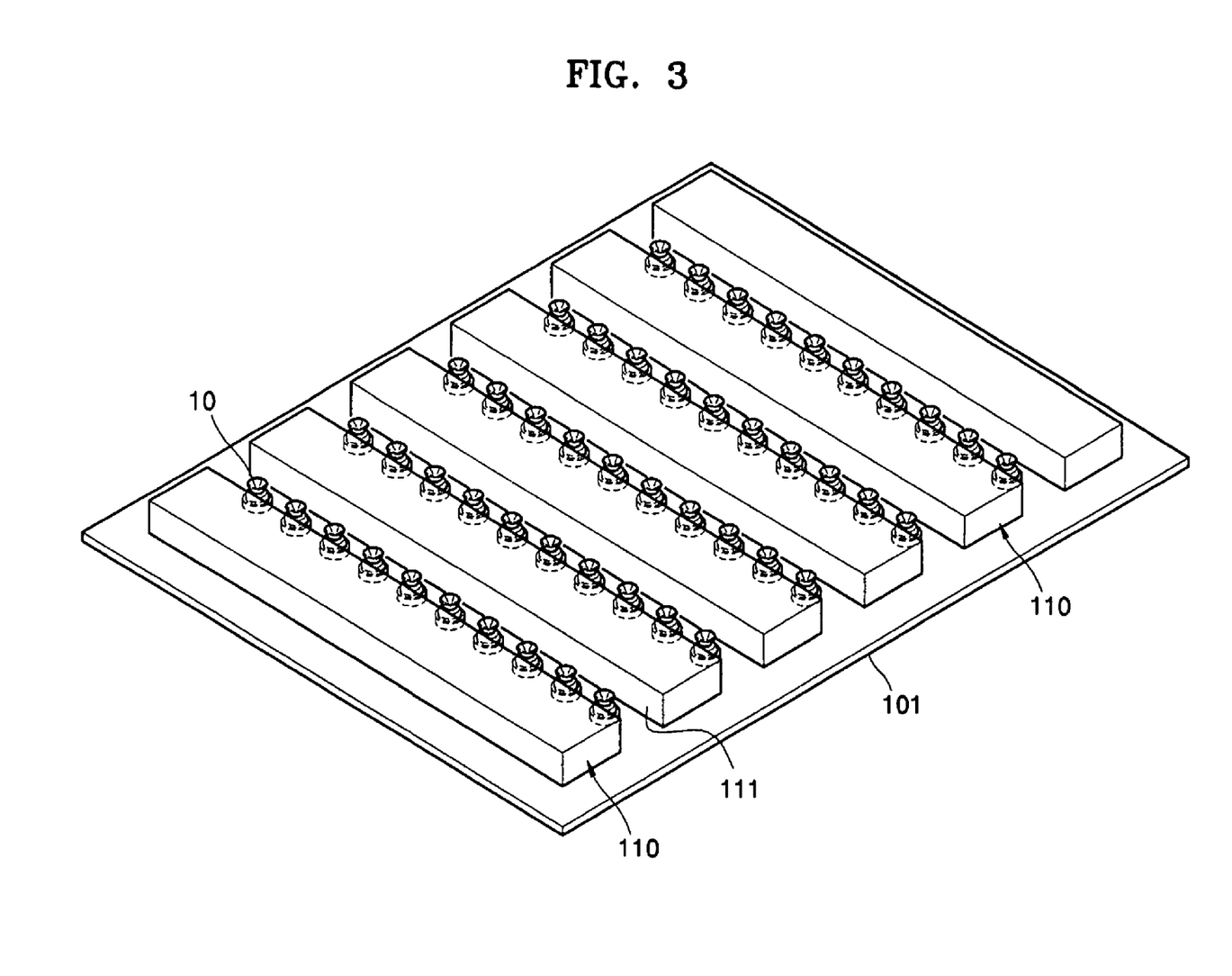
FIG. 3 is a perspective view schematically illustrating an arrangement of a light guide panel and light emitting devices according to an embodiment of the present general inventive concept.
Figure 4:
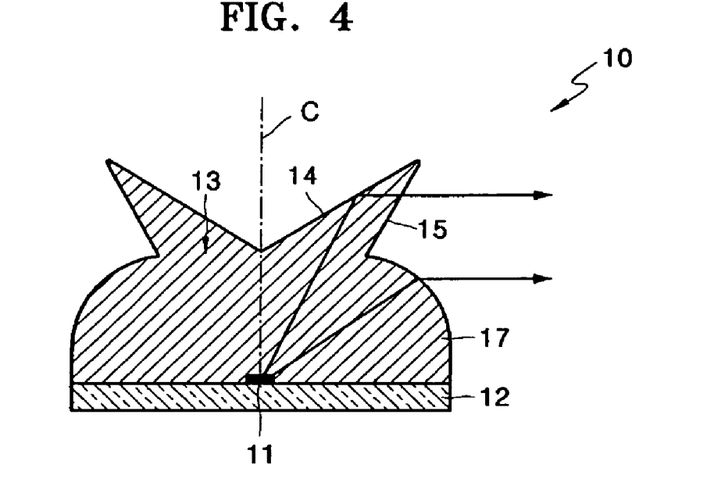
FIG. 4 is a detailed view of the light emitting device of FIG. 1.

FIGS. 1 and 2 are schematic sectional views of a backlight system according to an exemplary embodiment of the present general inventive concept, FIG. 3 is a perspective view schematically illustrating an arrangement of a light guide panel and light emitting devices according to an exemplary embodiment of the present general inventive concept, and FIG. 4 is a detailed view of the light emitting device of FIG. 1. Specifically, FIG. 1 is a sectional view taken along a length of a light emitting device and FIG. 2 is a sectional view taken along a direction perpendicular to the length of the light emitting device of FIG. 1.

Referring to FIGS. 1 through 4, a backlight system 100 includes a plurality of light emitting devices 10 arranged to form two or more light emitting device lines on a base plate 101, and a light guide panel 110 having a sidewall 111 is spaced apart from the plurality of light emitting devices 10 and a scattering region 115 is formed close to the base plate 101. Also, the backlight system 100 includes a transmission diffusion plate 140 disposed above the plurality of light emitting devices 10 to diffuse and transmit incident light. Throughout the detailed description, an upward direction represents a direction in which light is emitted out of the backlight system 100 (i.e., a direction away from the base plate 101). However, it should be understood that the "upward direction" referred to throughout this disclosure represents a reference direction only, and may alternatively be referred to as, for example, a lateral or horizontal direction if the backlight system is installed in an upright/vertical position.

The base plate 101 serves as a substrate on which the plurality of light emitting devices may be formed into a plurality of light emitting device lines.

The base plate 101 may be a printed circuit board (PCB) installed to electrically connect a light emitting diode chip 11 of each of the light emitting devices 10, for example, a metal core PCB (MCPCB). Alternatively, the backlight system 100 may have a structure that includes a base plate similar to the base plate 101 and a plurality of long plate-shaped PCBs disposed in two or more lines on the base plate. An example structure may include each of the long plate-shaped PCBs having a plurality of light emitting devices arranged in lines.

Referring to FIG. 3, the plurality of light emitting devices 10 are arranged on the base plate 101 to form two or more light emitting device lines, for instance, five or six lines. FIG. 3 illustrates an example of five light emitting device lines. In actuality, the number of the light emitting devices 10 on each of the plurality of light emitting device lines may be much greater than the number of light emitting devices illustrated in FIG. 3. As illustrated in FIG. 3, the plurality of light emitting devices 10 on each of the light emitting device lines are densely arranged, and a distance interval between the light emitting device lines is wider than a distance interval between the light emitting devices arranged in each line. The number of the light emitting device lines, the distance interval between the light emitting device lines, and the number of the light emitting devices 10 in each of the light emitting device lines may all be changed to accommodate varying design considerations.

As aforementioned, the plurality of light emitting devices 10 are arranged on the base plate 101 to form two or more light emitting device lines. The plurality of light emitting devices may be a variety of different colors (e.g. red(R), green(G) and blue(B)), but are not limited to only these example colors. The light emitting devices 10 may emit R, G and B colored light, and the R, G and B light emitting devices may be arranged in a variety of different configurations on each line. In this example, R, G and B light emitting diode chips are used as the R, G and B light emitting devices. The number of each of the R, G and B light emitting devices in each line may be changed depending on the amount of R, G and B light being emitted from each of the R, G and B light emitting devices.

The amount of R, G and B light emitted from each of the R, G and B light emitting devices may vary. For example, the amount of G light emitted from a G light emitting device may be less than the amount of R and B light emitted from the R and B light emitting devices. With consideration of the above example, R and B light emitting devices may be arranged in equal numbers and G light emitting devices may be arranged in a number two times greater than the number of the R and B light emitting devices. Also, the R, G and B light emitting devices may be arranged in a sequence (e.g. R, G, G and B or a sequence of B, G, G and R). Alternatively, the light emitting devices 10 may use light emitting diode chips each emitting white light.

Like in the above example, the plurality of light emitting devices 10 may be arranged in a variety of different configurations using the R, G and B light emitting diode chips emitting R, G and B light or using light emitting diode chips emitting white light. Therefore, an LCD using the backlight system 100 can display, for example, white or color images.

The light emitting device 10 is illustrated in greater detail in FIG. 4 according to an exemplary embodiment of the present general inventive concept. Each of the light emitting devices 10 may include a light emitting diode chip 11 that can emit light, and a collimator to collimate light incident from the light emitting diode chip 11. FIG. 4 shows an example of a side emitter 13 that allows incident light emitted from the light emitting diode chip 11 to travel toward an approximate side direction of the collimator.

The light emitting diode chip 11 can be coupled with the side emitter 13 on a base 12. The side emitter 13 may be in close contact with the light emitting diode chip 11. By having close contact between the side emitter 13 and the light emitting diode chip 11, the amount of light that emits from the light emitting diode chip 11 and is then incident into the side emitter 13 may be maximized.

The side emitter 13 has a transparent body made of transparent material. As illustrated in FIG. 4, the side emitter 13 may include a reflection surface 14 shaped like a funnel and angled at an incline with respect to a central axis (C), a first refraction surface 15 angled at an incline with respect to the central axis (C) to refract and transmit incident light that is reflected by the reflection surface 14, and a second refraction surface 17 extending from a bottom of the side emitter 13 to the first refraction surface 15 and having a convex shape. Light that emits from the light emitting diode chip 11 and then travels toward the reflection surface 14 of the side emitter 13 is reflected by the reflection surface 14 and travels toward the first refraction surface 15, transmits through the first refraction surface 15, and then travels toward an approximate side direction. Also, light emitted from the light emitting diode chip 11 travels toward the convex second refraction surface 17 transmits through the second refraction surface 17 and then travels toward the approximate side direction.

The side emitter 13 may have various shapes provided that it emits the light incident from the light emitting diode chip 11 toward an approximate side direction.

Figure 5:
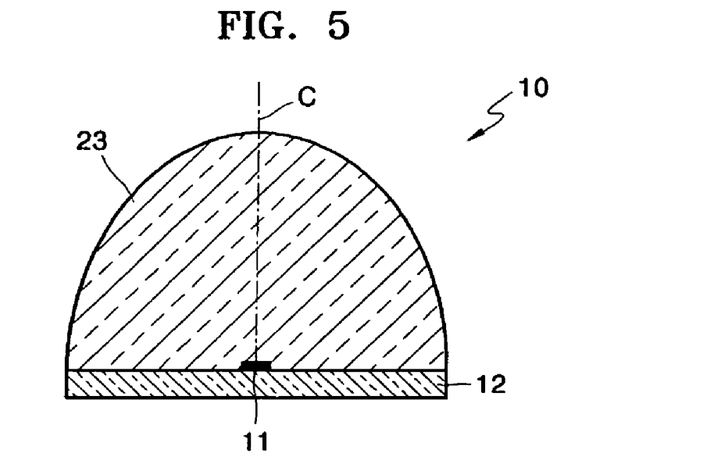
FIG. 5 is a schematic view of a light emitting device that can be used as a light source in a backlight system according to the embodiments of the present general inventive concept.

FIGS. 1 through 3 and FIG. 6 illustrate that the backlight system 100 according to the present general inventive concept is provided with a light emitting device 10 and a side emitter 13 serving as a collimator. The backlight system 100 may also be provided with a light emitting device 10 that includes a dome-shaped collimator 23 as illustrated in FIG. 5. Hereinafter, for convenience of description, the backlight system 100 provided with the light emitting device 10 including the side emitter 13 will be described.

Referring to FIGS. 2 and 3, the light guide panel 110 including the sidewall 111 and the scattering region 115, diffuses light incident from the light emitting device 10 through the sidewall 111. The sidewall 111 is spaced apart from the light emitting device 10, and the light diffusion occurs by an internal reflection of the light, where the internal reflection of the light is ideally a total internal reflection. The internal reflection of the light may include incident light and may be irregularly reflected into the scattering region 115 and emitted toward a direction opposite to the base plate 101.

The light guide panel 110 can be made of transparent material, for example, transparent polymethyl methacrylate (PMMA). The light guide panel 110 is formed adjacent to the light emitting device 10 and may partially enclose the light emitting device 10.

FIG. 3 illustrates that the backlight system 100 having long block type light guide panels 110, each of which has a respective sidewall 111 and which are arranged in parallel to the lines of light emitting devices 10. When the backlight system has the long block type light guide panels 110, as illustrated in FIG. 3, the light guide panels 110 are disposed between the light emitting device lines and at both side edges outside the outermost light emitting device lines. Therefore, if the number of the light emitting device lines is n, the number of the long block type light guide panels 110 is n+1.

Although FIG. 3 illustrates that the plurality of separate long block type light guide panels 110 are arranged in parallel with the light emitting device lines, the backlight system 100 of the present general inventive concept may have a light guide panel of a single body. For example, the light guide panel may be designed having a plurality of through holes formed at positions corresponding to the plurality of light emitting devices, or may be designed having a plurality of through holes formed at positions corresponding to the plurality of light emitting device lines with a connection portion formed at an end of the light emitting device line.

Figure 6:
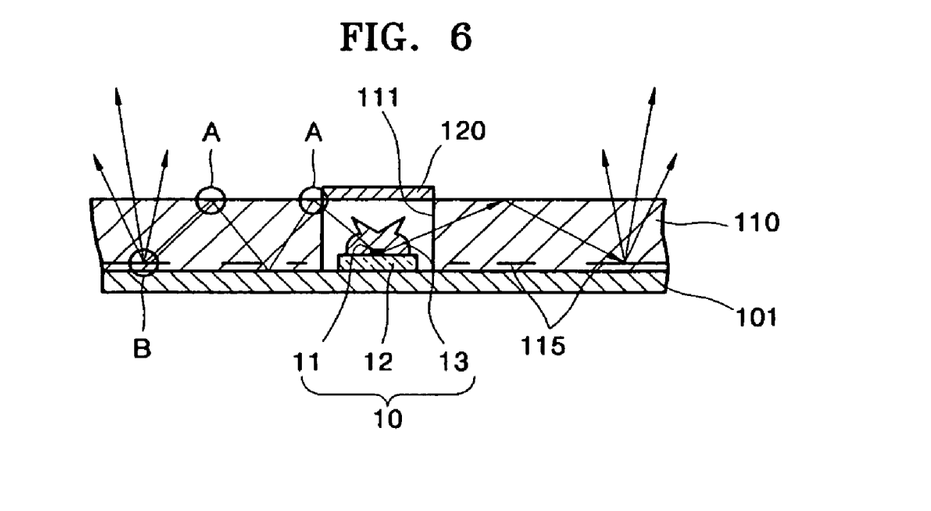
FIG. 6 is a schematic view illustrating light traveling within a light guide panel of FIG. 1.

FIG. 6 is a schematic view illustrating the path in which the light travels within the light guide panel 110 of FIG. 1.

Referring to FIGS. 2 and 6, the scattering region 115 is formed at a side of the light guide panel 110 that is close to the base plate 101, for example, at a lower surface thereof facing the base plate 101. The scattering region 115 irregularly reflects light that is incident into the scattering region 115 while traveling inside the light guide panel 110 such that the irregularly reflected light emits toward a direction opposite to the side of the base plate 101. As illustrated in FIGS. 2 and 6, the scattering region 115 is discontinuously formed. Furthermore, the components of the scattering region 115 have a width that increases based on the distance from the light emitting devices 10. In this case, the scattering region 115 has the widest width at a center portion between the light emitting device lines.

By having a wider component of the scattering region 115 at a position furthest away from the light emitting devices 10, light is allowed to be irregularly reflected at a wider region, thus emitting light more uniformly in an upward direction of the light guide panel 110. The reason that this occurs is because a greater amount of light is present closer to the light emitting device 10 while a lesser amount of light is present further away from the light emitting device 10. Therefore, by having a wider component of the scattering region 115 at a distance further away from the light emitting device lines, there may be an increase in the amount of incident light irregularly reflected in an upward direction of the light guide panel 110.

As noted above, the scattering region 115 can be obtained by forming a scattering pattern to irregularly reflect incident light. Alternatively, the scattering region 115 may be obtained by spreading a diffusion material to irregularly reflect incident light. For example, when a material such as white ink (corresponding to diffusion material) is printed relatively thick on a lower surface of the light guide panel 110 such that a discontinuous scattering region 115 is formed, the scattering region 115 can then irregularly reflect incident light.

Once light is incident into an inside of the light guide panel 110 from the light emitting device 10, for example, at an angle that provides total internal reflection inside the light guide panel 110, the incident light is totally internally reflected by the upper surface and the lower surface of the light guide panel 110 and is then spread away from the light emitting device 10 and along the light guide panel 110. In the case where the light guide panel 110 is made of PMMA having a refractivity index of approximately 1.5 in air, all light that is incident into the upper surface or lower surface of the light guide panel at an incident angle of more than 41 degrees is totally internally reflected. The incident light spreads throughout the whole light guide plate 110 due to total internal reflection, and thus the overall thickness of the backlight system 100 may be reduced. Although some incident light is present at an angle not satisfying the condition of total internal reflection (i.e. 41 degrees for this example), the incident light is still spread inside the light guide panel 110 because a significant amount of light of the incident light can still be reflected by internal reflection. Portion 'A' in FIG. 6 illustrates total internal reflection.

Once light traveling inside the light guide panel 110 is incident at a portion close to the base plate 101 of the light guide panel 110, for example, into the scattering region 115 formed at a lower surface of the light guide panel 110, the incident light is irregularly reflected by the scattering region 115 and is then emitted through the upper surface of the light guide panel 110. Portion 'B' in FIG. 6 illustrates the irregular reflection of light incident into the scattering region 115.

Since the internal reflection and irregular reflection in the light guide panel 110 allow the light emitting from the light emitting device 10 to be spread widely, the backlight system 100 can be designed thinner, and it is possible to uniformly irradiate light while allowing a certain distance between light emitting device lines. When increasing the distance between the light emitting device lines, it is possible to decrease the total number of the light emitting device lines required by the backlight system, and thus reduce the number of the light emitting devices 10.

Most light emitting from the light emitting diode chip 11 of the light emitting device 10 travels toward the side direction and is then incident into the inside of the adjacent light guide panel 110. The incident light may be spread widely throughout the light guide panel 110, but light passing through the reflection surface 14 of the side emitter 13 and then traveling in the upward direction may also exist. The amount of the light traveling in the upward direction of the side emitter 13 may be, for example, about 20% of the amount of light emitted from the light emitting diode chip 11.

For example, referring to FIG. 4, though the reflection surface 14 of the side emitter 13 is formed to satisfy the condition of total internal reflection, since the light emitting from the light emitting diode chip 11 is spread omnidirectionally, it is not possible to satisfy the condition of total internal reflection with respect to all light. Therefore, some light may pass through the side emitter 13 and travel upwards relative to positioning of the side emitter 13 in FIG. 4. Also, although the reflection surface 14 is formed by a reflection coating, a coating condition of the reflection surface 14 may not provide a complete total reflection. To this end, under realistic circumstances, the reflection surface 14 is coated to obtain a proper amount of reflectivity. Therefore, under these realistic circumstances, a partial amount of light may exist that travels in an upward direction of the side emitter 13.

The light traveling in the upward direction of the side emitter 13 may cause a light spot or a brightness line to appear on the light emitting diode chip 11, at a position viewed from an upper portion of the backlight system 100. Also, when R, G and B light emitting devices emitting R, G and B lights, respectively, are disposed to reproduce colors, certain colors may also appear when viewed from an upper portion of the backlight system 100.

In order to reduce the likelihood of light spots, brightness lines or unexpected colors from appearing at the position of the light emitting diode chip 11, when a reflection mirror is disposed, a dark portion may be generated at a portion corresponding to the position of the reflection mirror.

Figure 7:
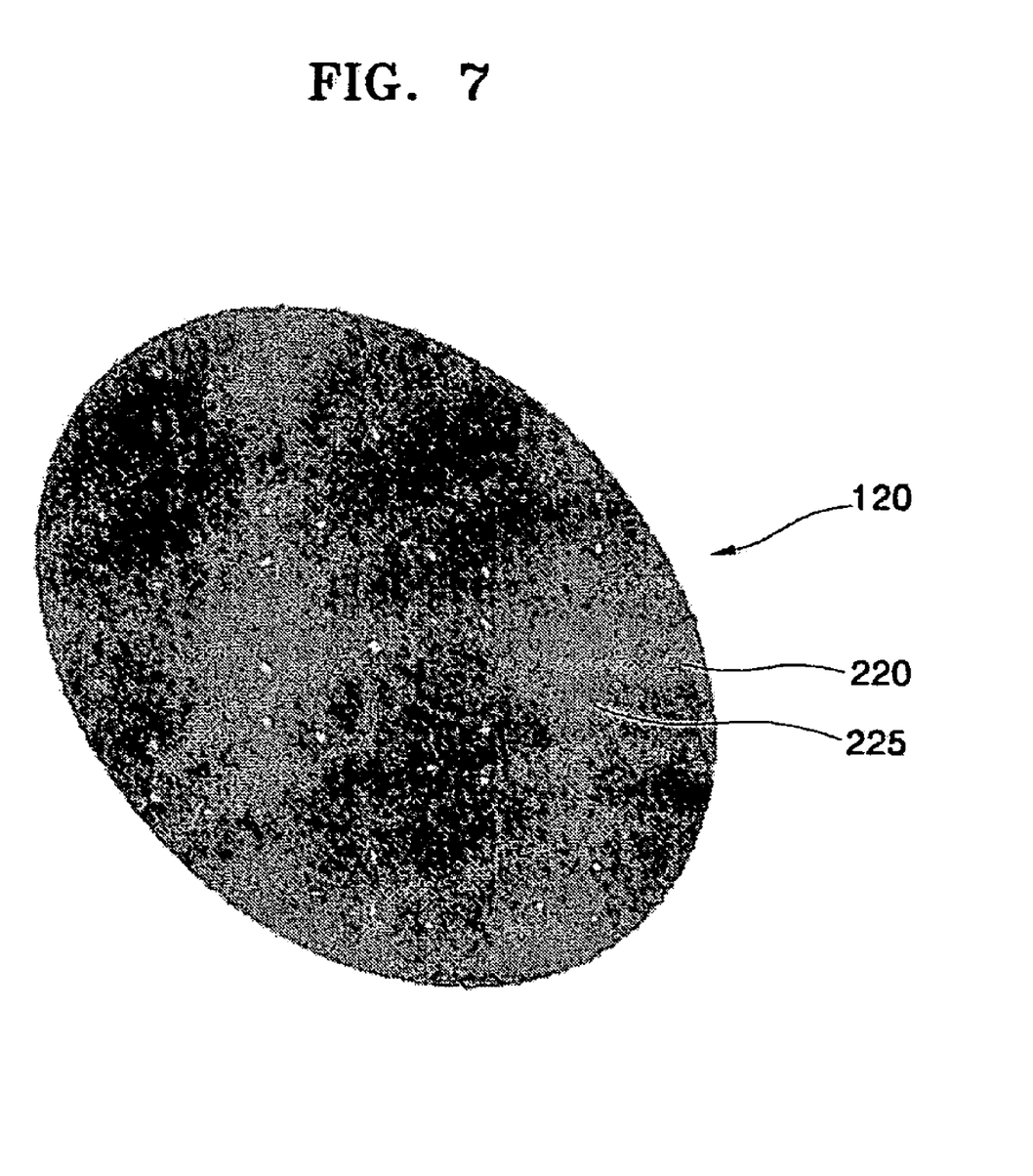
FIG. 7 is a view illustrating an example of the partial blocking member of FIG. 1.

Accordingly, the backlight system 100 of the present general inventive concept may further provide a partial blocking member 120, as illustrated in FIG. 7, which decreases the amount of light emitted from the light emitting device 10 that travels in a direction away from the base plate 101 (i.e., toward the transmission diffusion plate 140). The partial blocking member may also allow some of the light generated by the light emitting device 10 to pass through some of the partial blocking member 120.

The partial blocking member 120 may include a reflection member 220 having a plurality of fine holes 225, as illustrated in FIG. 7. The reflection member 220 may have a structure including a reflection surface formed on at least one surface portion thereof, and the reflection surface having a plurality of fine holes. Alternatively, the reflection member 220 may have a plurality of fine holes that completely penetrate the reflection member 220.

When the partial blocking member 120 includes the reflection member 220 having the plurality of fine holes 225, incident light can pass through the partial blocking member 120 by a predetermined amount. Therefore, this configuration may reduce the likelihood of a light spot, brightness line or unexpected color from appearing at the position of the light emitting diode chip 11. Also, a likelihood that an undesirable dark area is generated can also be reduced.

Figure 8:
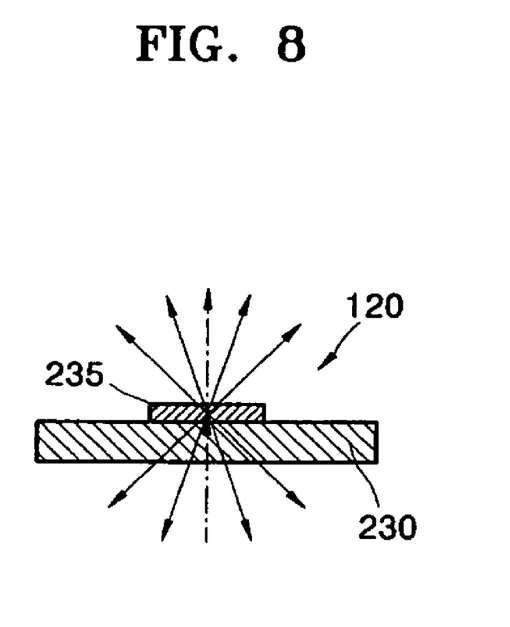
FIG. 8 is a view illustrating another example of the partial blocking member of FIG. 1.

Alternatively, as illustrated in FIG. 8, the partial blocking member 120 may have a structure that includes a diffusion material region 235 that is formed on at least one surface of a transparent member 230. In this case, the diffusion material region 235 may be continuous or discontinuous.

The diffusion material region 235 may be, for example, formed by printing white ink on at least one surface of the transparent member 230. When the white ink is printed or painted thin on the surface of the transparent member 230, high transmittance is obtained. Conversely, when the white ink is printed or painted thick on the surface of the transparent member 230, high reflectivity is obtained. Therefore, by printing or painting white ink at a proper thickness, it is possible to allow a desired amount of light to travel in the upward direction of the light emitting device 10.

The partial blocking member 120 can, for example, be disposed only on the light emitting device line. The partial blocking member 120 may be coupled with the light guide panel 110 such that the partial blocking member 120 is disposed only on a space where the light emitting device 10 is placed.

Also, the partial blocking member 120 may be formed on one surface of a transparent plate (not shown) such that it is placed on the light emitting device line and the transparent plate is spaced apart from the light guide panel 110 using a transparent spacer (not shown). In this case, the transparent spacer supports the transparent plate with respect to the light guide panel 110 or the base plate 101. The transparent plate and the transparent spacer may be made of transparent PMMA. In this case, the transparent plate also performs the function of the transmission diffusion plate 140.

The transmission diffusion plate 140 is positioned spaced apart by a predetermined distance from a lower portion of the backlight system 100. The transmission diffusion plate 140 diffuses and transmits light emitted from the light emitting device 10 and the light guide panel 110 and traveling in the direction away from the base plate 101.

If, for example, the transmission diffusion plate 140 is too close to the light emitting device 10, the area where the light emitting device 10 is positioned appears brighter than the remaining area where the light emitting device 10 is not positioned, so that uniformity in brightness may be deteriorated. Also, as the distance between the transmission diffusion plate and the light emitting device 10 increases, the relative thickness of the backlight system also increases. Therefore, a separation distance between the transmission diffusion plate 140 and the lower portion of the backlight system including the light emitting device 10 is optimum at a value where the light can be mixed to a desired degree by light diffusion.

The backlight system 100 of the present general inventive concept may be further provided with a brightness enhancement film (BEF) 150 to enhance the directivity of light emitted from the transmission diffusion plate 140. Also, the backlight system 100 may be further provided with a polarization enhancement film 170 to enhance the polarization efficiency.

The BEF 150 refracts and focuses the light emitted from the transmission diffusion plate 140 to enhance the directivity of the light, thereby enhancing brightness.

The polarization enhancement film 170, for example, transmits p-polarized light but reflects s-polarized light, so that most of the incident light is emitted in one polarization state, for example, the p-polarized state.

As aforementioned, in the backlight system 100 of the present general inventive concept, the light emitted from the light emitting device 10 in the side direction is incident into the light guide panel 110. The incident light is spread wide by internal reflection inside the light guide panel 110, ideally by total internal reflection, and is irregularly reflected in the scattering region 115, and emitted toward the transmission diffusion plate 140.

Since the incident light is spread wide over the entire area of the light guide panel 110 and then emitted, it is possible to decrease a distance interval between the light emitting device 10 and the transmission diffusion plate 140, thereby making it possible to decrease the relative thickness of the backlight system 100. Also, it is possible to permit a sufficiently wide distance interval between the light emitting device lines.

Figure 9:
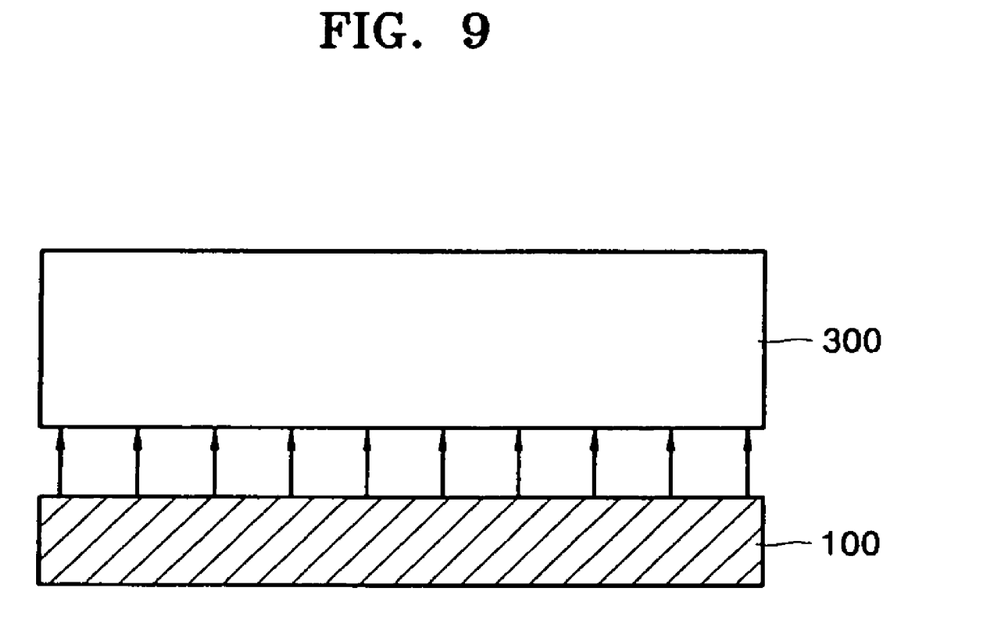
FIG. 9 is a schematic view illustrating an LCD employing a backlight system according to the embodiments of the present general inventive concept.

FIG. 9 is a schematic view illustrating an LCD employing the backlight system 100 according to the present general inventive concept.

Referring to FIG. 9, the LCD includes a backlight system 100 and a liquid crystal panel 300 disposed on the backlight system 100. As is well known in the art, the liquid crystal panel 300 allows light linearly polarized in one state to be incident into a liquid crystal layer of the liquid crystal panel, and changes direction of a liquid crystal director by an electric field driving to change polarization of the light passing through the liquid crystal layer, thereby displaying image information. The liquid crystal panel 300 is connected with a driving circuit part. Since detailed constructions and display operations of the liquid crystal panel 300 are well known to those skilled in the art, their detailed description will be omitted.

As the light incident into the liquid crystal panel 300 approaches a single polarization, it is possible to enhance the light usage efficiency. Thus, by providing the backlight system 100 with a polarization enhancement film 170, it is possible to enhance the light efficiency.

As described above, according to the backlight system 100 of the present general inventive concept, it is possible to make the brightness distribution of light uniform over an entire area, while decreasing the thickness of the backlight system 100. Therefore, by employing such a backlight system 100 in the LCD, an overall thickness of the LCD can be reduced, while maintaining an optimal quality image having uniform brightness over the entire area of the LCD.

As aforementioned, in the backlight system 100 of the present general inventive concept, the light emitting in the side direction from the light emitting device 10 is incident into the light guide panel 110, is spread wide by internal reflection inside the light guide panel, and is irregularly reflected in the scattering region and emitted.

As a result of the operation of the backlight system 100, since the incident light is spread wide over an entire area of the light guide panel 110 and then emitted, it is possible to decrease an interval between the light emitting device 10 and the transmission diffusion plate 140, thereby making it possible to reduce the thickness of the backlight system 100. Also, it is possible to permit a sufficiently wide distance interval between the light emitting device lines and to irradiate uniform light.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A backlight system comprising:
a plurality of light emitting devices arranged on a base plate to form a plurality of lines; and
a light guide panel arranged on the base plate and having a sidewall spaced apart from the plurality of light emitting devices such that light incident from the plurality of light emitting devices is dispersed by inner reflection, and a scattering region formed adjacent to the base plate such that light incident into the scattering region is irregularly reflected to be emitted away from the base plate.

2. The backlight system of claim 1, wherein the scattering region is discontinuously formed.

3. The backlight system of claim 2, wherein the scattering region comprises at least one component having a width that increases in proportion to a distance away from the plurality of light emitting devices.

4. The backlight system of claim 2, wherein the scattering region comprises a scattering pattern formed to irregularly reflect incident light or a diffusion material spread to irregularly reflect incident light.

5. The backlight system of claim 1, further comprising:
a transmission diffusion plate to diffuse and transmit light that emits from the plurality of light emitting devices and travels in a direction away from the base plate and through the light guide panel.

6. The backlight system of claim 5, further comprising:
a partial blocking member that partially transmits light that is emitted from the light emitting device and travels in a direction away from the base plate by decreasing the amount of the traveling light.

7. The backlight system of claim 6, wherein the partial blocking member comprises a reflection member having a plurality of holes.

8. The backlight system of claim 6, wherein the partial blocking member has a structure including a transparent member and a diffusion material region formed on at least one surface of the transparent member.

9. The backlight system of claim 6, further comprising:
at least one of a brightness enhancement film to enhance the directivity of light emitted from the transmission diffusion plate; and
a polarization enhancement film to enhance polarization efficiency.

10. The backlight system of claim 5, further comprising:
at least one of a brightness enhancement film to enhance the directivity of light emitted from the transmission diffusion plate and a polarization enhancement film to enhance polarization efficiency.

11. The backlight system of claim 1, wherein the light emitting device comprises:
a light emitting diode chip to generate light; and
a collimator to collimate light incident from the light emitting diode chip.

12. The backlight system of claim 11, wherein the collimator is any one of a side emitter allowing incident light to travel in an approximate side direction and a dome-shaped collimator.

13. The backlight system of claim 1, wherein the light guide panel is shaped in a long block arranged in parallel with at least one of the lines of the plurality of light emitting devices, and is disposed at an outer portion of the line of the plurality of light emitting devices and between the lines of the plurality of light emitting devices.

14. The backlight system of claim 13, wherein the light guide panel is made of transparent PMMA.

15. The backlight system of claim 14, wherein the scattering region is formed at a surface adjacent to the base plate of the light guide panel.

16. An LCD comprising:
a liquid crystal panel; and
a backlight system to irradiate light toward the liquid crystal panel,
wherein the backlight system comprises:
a plurality of light emitting devices arranged on a base plate to form a plurality of lines; and
a light guide panel having a sidewall spaced apart from the plurality of light emitting devices such that light incident from the plurality of light emitting devices is dispersed by inner reflection, and a scattering region formed adjacent to the base plate such that light incident into the scattering region is irregularly reflected to be emitted away from the base plate.

17. The LCD of claim 16, wherein the scattering region is discontinuously formed.

18. The LCD of claim 17, wherein the scattering region comprises at least one component having a width that increases in proportion to a distance away from the plurality of light emitting devices.

19. The LCD of claim 17, wherein the scattering region comprises a scattering pattern formed to irregularly reflect incident light or a diffusion material spread to irregularly reflect incident light.

20. The LCD of claim 16, further comprising:
a transmission diffusion plate to diffuse and transmit light that emits from the plurality of light emitting devices and travels in a direction away from the base plate through the light guide panel.

21. The LCD of claim 20, further comprising:
a partial blocking member that partially transmits light that is emitted from the light emitting device travels in a direction away from the base plate, by decreasing the amount of the traveling light.

22. The LCD of claim 21, wherein the partial blocking member comprises a reflection member having a plurality of holes.

23. The LCD of claim 21, wherein the partial blocking member has a structure including a transparent member and a diffusion material region formed on at least one surface of the transparent member.

24. The LCD of claim 21, further comprising:
at least one of a brightness enhancement film to enhance the directivity of light emitted from the transmission diffusion plate and a polarization enhancement film to enhance polarization efficiency.

25. The LCD of claim 20, further comprising:
at least one of a brightness enhancement film to enhance the directivity of light emitted from the transmission diffusion plate and a polarization enhancement film to enhance polarization efficiency.

26. The LCD of claim 16, wherein the light emitting device comprises:
a light emitting diode chip to generate light; and
a collimator to collimate light incident from the light emitting diode chip.

27. The LCD of claim 26, wherein the collimator is any one of a side emitter allowing incident light to travel in an approximate side direction and a dome-shaped collimator.

28. The LCD of claim 16, wherein the light guide panel is shaped in a long block arranged in parallel with at least one of the lines of the plurality of light emitting devices, and is disposed at an outer portion of the line of the plurality of light emitting devices and between the lines of the plurality of light emitting devices.

29. The LCD of claim 28, wherein the light guide panel is made of transparent PMMA.

30. The LCD of claim 29, wherein the scattering region is formed at a surface adjacent to the base plate of the light guide panel.

31. A backlight system, comprising:
a base plate;
a plurality of light emitting devices arranged in lines on the base plate;
a plurality of light guide panels, disposed on the base plate to surround opposite sides of the lines of light emitting devices; and
a plurality of scattering regions disposed between the base plate and a surface of the plurality of light guide panels adjacent to the base plate,
wherein a light emitted by the light emitting devices parallel to the base plate is incident to the plurality of light guide panels, each light guide panels disperses the incident light by inner reflection, and the plurality of scattering regions irregularly reflect the dispersed light away from the base plate.

32. The backlight system of claim 31, further comprising:
a plurality of collimators corresponding to the plurality of light emitting devices to direct the light emitted by the light emitting devices in a direction parallel to the base plate.

33. The backlight system of claim 31, further comprising:
a partial blocking member disposed above each of the plurality of light emitting devices to partially block a light emitted in a direction perpendicular to the base plate.

34. The backlight system of claim 31, wherein the plurality of light guide panels are rectangular in shape, each having a flat bottom surface adjacent to the base plate.

35. The backlight system of claim 31, wherein the plurality of scattering regions comprise a plurality of separate scattering regions corresponding to each light guide panel, and wherein the corresponding plurality of separate scattering regions increase in width with an increase in distance away from the light emitting devices.

* * * * *